G. LAUBE.

Assignor, by direct and mesne assignments, of five-eighths, to T. J. McBRIDE and McINTOSH HOWES.

STRAW BURNER.

No. 11,085. Reissued June 10, 1890.

Witnesses.
W. H. Blodgett,
Frank D. Merchant

Inventor
Godfrid Laube

By his Attorneys.
Williamson & Blodgett.

THE NORRIS PETERS CO., PHOTO-LITHO., WASHINGTON, D. C.

UNITED STATES PATENT OFFICE.

GODFRIED LAUBE, OF HURON, (DAKOTA TERRITORY,) SOUTH DAKOTA, ASSIGNOR OF FIVE-EIGHTHS, BY DIRECT AND MESNE ASSIGNMENTS, TO T. J. McBRIDE, OF WINNIPEG, CANADA, AND McINTOSH HOWES, OF ST. PAUL, MINNESOTA.

STRAW-BURNER.

SPECIFICATION forming part of Reissued Letters Patent No. 11,085, dated June 10, 1890.

Original No. 391,254, dated October 16, 1888; application for reissue filed November 15, 1889. Serial No. 330,487.

*To all whom it may concern:*

Be it known that I, GODFRIED LAUBE, a citizen of the United States, and a resident of Huron, in the county of Beadle and State of South Dakota, have invented certain new and useful Improvements in Straw-Burners; and I do hereby declare that the following is a full, clear, and exact description of the invention, which will enable others skilled in the art to which it appertains to make and use the same, reference being had to the accompanying drawings, which form a part of this specification, and in which—

Figure 1:
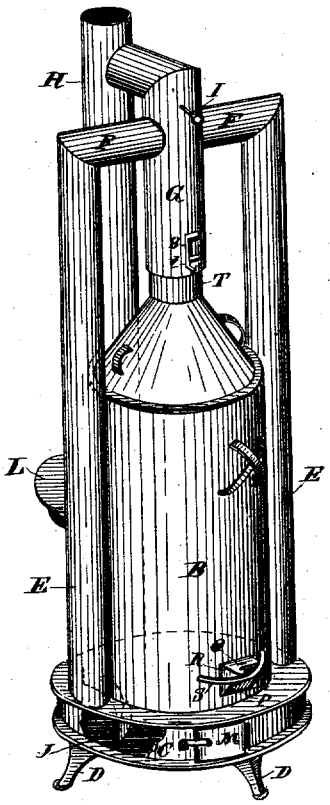
Figure 2:
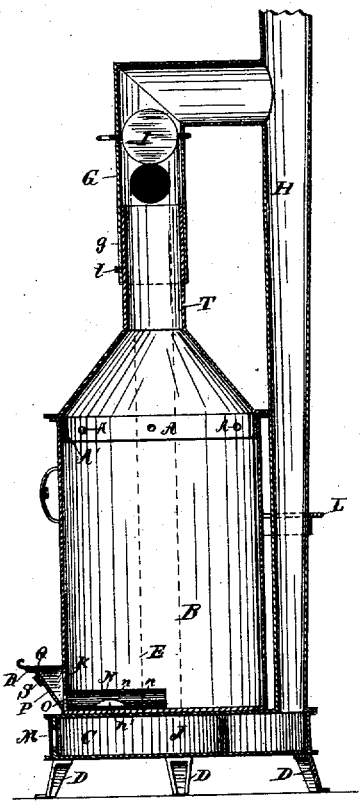
Figure 3:
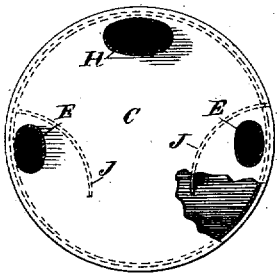

Figure 1 is a perspective view of my improved straw-burner with a portion broken away to more clearly show the construction of my invention. Fig. 2 is a longitudinal vertical sectional view of the same, and Fig. 3 is a horizontal sectional view taken through the lower ends of the conducting-tubes and smoke-pipe.

Similar letters of reference denote corresponding parts in the several figures.

My invention has relation to straw-burning base-heating stoves; and it consists in certain new and useful improvements of the same, as will be hereinafter fully set forth.

In the accompanying drawings, the letter B indicates the straw-magazine supported upon the base-heating drum C, which is supported upon legs D, and has communicating with it two conducting-tubes E, having their upper bent ends F in turn communicating with the downward extension G of the smoke-pipe H, the lower end of which also communicates with the heating-drum. In the upper portion of the extension G, above the conducting-tubes, is a damper I, the object of which will be hereinafter set forth.

Secured in the heating-drum to the rear and at the side of the conducting-tubes are two curved plates or strips J, forming compartments closed at their rear and open at their front.

On the bottom of the straw-magazine is secured a draft-tube N, having draft-holes *n n* formed in its upper portion, which, together with its open inner end and the notches *n'* upon its lower edge, admit of sufficient draft from the bottom for burning the straw. One end of this tube communicates with a small hole O in the side of the magazine near the bottom, and thus affords communication between the outer air and the interior of the drum. An inclined draft flue or cup P is secured to the outer side of the magazine, with its lower end inclosing the hole O, and the upper portion is provided with a damper Q, which is adjustably secured thereto by means of the flanges R. A brace S is secured at its ends to the side of the magazine and at its middle portion to the cup, thus forming a handle by means of which the magazine can be turned up to empty out the ashes. The cover for the magazine is preferably made cone-shaped and has a short tube or pipe T extending from its top up into the lower end of the piece of pipe G, by means of which communication is established between the interior of the magazine and the stove-pipe. The rim A' of the cover fits within the top of the magazine and is provided with a series of draft-holes A. In the lower portion of the pipe G is a notched slot *g*, through which a lug or handle *t* upon the tube T projects, and by means of which the cover can be raised or lowered and supported in any desired position, the lug engaging with the notches of the pipe G.

The straw-magazine B is further provided with a hole K in its side above the draft-opening of the draft-cup, the object of which is to permit the straw within the magazine to be poked or attended to.

L represents shelves secured to the smoke-pipe and conducting-tubes, and upon which dishes containing eatibles may be placed to keep warm, and M represents a draft-door secured to the side of the heating-drum.

In operation the magazine, after having been filled with straw, is placed upon the top of the heating-drum, and its top, having the draft-holes A in its downwardly-projecting rim A', is adjusted to produce the desired draft, and the damper in the upper portion of the extension of the smoke-pipe is turned in such a manner as to let the hot air and products of combustion escape directly through the smoke-pipe. Now, should it be desired to increase the heat, the damper is turned horizontally, which causes the hot air and products of combustion, instead of escaping directly through the smoke-pipe, to descend through the conducting-tubes into the heating-drum, the curved strips or plates causing the hot air and products of combustion to be carried to the front of the drum, and the draft will then draw them to the rear and thence up through the chimney.

It will be seen that by the employment of the conducting-tubes and heating-drum a larger heating-surface is obtained, and consequently a greater amount of heat is given.

From the foregoing description, taken in connection with the accompanying drawings, the operation and advantages of my invention will be readily understood. It will be seen that the curved strips or plates cause the hot air and products of combustion to be equally distributed in the heating-drum, for if no strips were employed the smoke, &c., would only be carried as far forward as the conducting-tubes themselves, when it would be immediately drawn to the rear and thence through the smoke-pipe.

Having thus described my invention, I claim—

1. In a straw-burner, the combination, with a magazine having a hole in its side near its bottom, of a draft-flue upon the bottom of the magazine, a draft-cup upon the outside of the magazine, said cup and flue communicating with the hole in the side of the magazine, the flue being provided with holes along its upper portion, and the cup being provided with flanges at its top, and a damper adjustably secured upon the flanges of the cup, substantially as and for the purpose set forth.

2. The combination, with a base-heating drum, of diving-flues so located on said drum as to leave a clear space between them, and a removable magazine mounted on the drum and communicating with the diving-flues, substantially as and for the purpose specified.

GODFRIED LAUBE.

In presence of—
WM. H. BROWN,
W. E. CHAPIN.